J. R. WENDT.
Making Metal Beads.
No. 16,631. Patented Feb. 10, 1857.
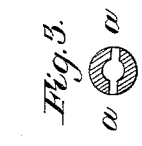
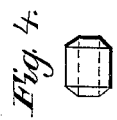
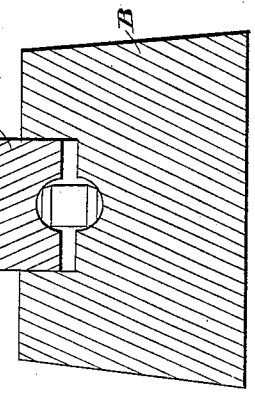
Fig. 7.
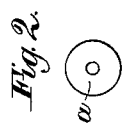
Fig. 1. Fig. 2. Fig. 5.

UNITED STATES PATENT OFFICE.

JOHN R. WENDT, OF BOSTON, MASSACHUSETTS, ASSIGNOR TO J. R. WENDT AND AUGUSTUS ROGERS, OF BOSTON, MASSACHUSETTS.

MANUFACTURE OF METALLIC BEADS.

Specification of Letters Patent No. 16,631, dated February 10, 1857.

*To all whom it may concern:*

Be it known that I, JOHN R. WENDT, of Boston, in the county of Suffolk and State of Massachusetts, have invented an Improved Manufacture of Hollow Metallic Beads or Balls; and I do hereby declare that the same is fully described and represented in the following specification and the accompanying drawings, of which—

Figure 1 is a front view of one of the said beads. Fig. 2 is an end view of it. Fig. 3 is a longitudinal section of it. Fig. 4 is a side view of a tubular bead blank. Fig. 5 is a longitudinal section. Fig. 6 is an end view of it.

In the manufacture of small gold or silver beads to be worn as ornaments on the neck of a person, jewelers have usually constructed each from two small or hollow hemispheres of metal placed together and connected by solder applied to their edges. This process of making a bead involves the necessity of having a seam entirely around it, and besides this, a hole has to be made axially through it for the reception of a string. The labor required in forming and finishing such is considerable, and by my process it is much lessened, as by it I can make about thirty beads, in the same time that one can be made on the old plan above mentioned.

By my process, the bead is made as a thin hollow sphere, or ball, with openings at its opposite ends and it can be constructed not only in less time, but with great economy of metal in comparison to what is usually consumed in the manufacture of metallic beads by the ordinary method.

In carrying out my invention, I first reduce the silver, gold or metal employed to a tubular form, and with a diameter externally to correspond with that of the bead when said bead is finished. Having made it in the shape of a long tube. I next reduce this tube into a number of shorter tubes by sawing or filing it transversely, so as to give each tube or blank the form as shown in Figs. 4, 5, and 6. Next, I make use of a set of spherical dies A, B. (See Fig. 7, which denotes a sectional view of such dies.) Into these I place the tubular blank so that its axis shall stand vertically or so that such blank when the dies are forced together, or one down toward the other, may be compressed in line of its axis and each of its two ends swaged down into a cup shape or semi-spherical form or an approximation thereto, in which there will be holes or passages $a$, $a$, for the reception of a string. In this way beads may be made very rapidly and to great advantage.

I do not claim making a piece of metal into a tubular form nor swaging a piece of metal by dies when these processes are separately considered, but What I do claim is—

My improved manufacture of hollow beads of metal as made by the operation of reducing the metal to a tubular form and that of compressing it axially in dies, as specified.

In testimony whereof I have hereunto set my signature this eighteenth day of November A. D. 1856.

JOHN R. WENDT.

Witnesses:
R. H. EDDY,
F. P. HALE, Jr.